(12) United States Patent
Kim et al.

(10) Patent No.: US 10,659,948 B2
(45) Date of Patent: May 19, 2020

(54) METHOD AND APPARATUS FOR PERFORMING DATA EXCHANGE BY NAN TERMINAL IN WIRELESS COMMUNICATION SYSTEM

(71) Applicant: LG ELECTRONICS INC., Seoul (KR)

(72) Inventors: Dongcheol Kim, Seoul (KR); Giwon Park, Seoul (KR); Byungjoo Lee, Seoul (KR); Youngjun Jo, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/062,958

(22) PCT Filed: Dec. 19, 2016

(86) PCT No.: PCT/KR2016/014868
§ 371 (c)(1),
(2) Date: Jun. 15, 2018

(87) PCT Pub. No.: WO2017/105152
PCT Pub. Date: Jun. 22, 2017

(65) Prior Publication Data
US 2019/0007821 A1 Jan. 3, 2019

Related U.S. Application Data

(60) Provisional application No. 62/268,521, filed on Dec. 17, 2015, provisional application No. 62/387,400, filed on Dec. 24, 2015.

(51) Int. Cl.
*H04W 8/00* (2009.01)
*H04L 29/08* (2006.01)
(Continued)

(52) U.S. Cl.
CPC .............. *H04W 8/005* (2013.01); *H04L 67/16* (2013.01); *H04L 69/16* (2013.01); *H04W 80/02* (2013.01); *H04W 84/12* (2013.01)

(58) Field of Classification Search
CPC ..... H04W 8/005; H04W 80/02; H04W 84/12; H04L 67/16; H04L 69/16
See application file for complete search history.

(56) References Cited

U.S. PATENT DOCUMENTS

| 7,797,429 B2 * | 9/2010 | Liang ................ H04L 29/12377 370/422 |
| 2009/0216535 A1 * | 8/2009 | Entlis ...................... G10L 15/02 704/254 |

(Continued)

FOREIGN PATENT DOCUMENTS

| WO | WO 2015/152657 A1 | 10/2015 |
| WO | WO 2015/157566 A2 | 10/2015 |

OTHER PUBLICATIONS

Camps-Mur et al., "Enabling Always on Service Discovery: Wifi Neighbor Awareness Networking," IEEE Wireless Communications, vol. 22, Issue 2, Apr. 29, 2015, pp. 1-8 (10 pages total).
(Continued)

*Primary Examiner* — Ajay Cattungal
(74) *Attorney, Agent, or Firm* — Birch, Stewart, Kolasch & Birch, LLP

(57) ABSTRACT

The present specification may provide a method for performing data exchange by NAN terminal in a wireless communication system. In this instance, the method in which the NAN terminal performs data exchange may comprises the steps of: discovering a first service by a first NAN terminal using at least one of a publish message and a subscribe message; transmitting a data request message associated with the discovered first service to a second NAN terminal by the first NAN terminal; receiving a data
(Continued)

response message from the second NAN terminal by the first NAN terminal; and performing data exchange relating to the first service with the second NAN terminal by the first NAN terminal. In this case, the data request message may be transmitted on the basis of a data request method called by the first NAN terminal, and service protocol type information and port number information, which are returned as a return value, may be included in the data request message and may be transmitted on the basis of the data request method.

15 Claims, 14 Drawing Sheets

(51) Int. Cl.
  *H04L 29/06* (2006.01)
  *H04W 80/02* (2009.01)
  *H04W 84/12* (2009.01)

(56) References Cited

U.S. PATENT DOCUMENTS

| | | | | |
|---|---|---|---|---|
| 2012/0011281 | A1* | 1/2012 | Hamada | H04L 61/2517 709/246 |
| 2014/0019607 | A1* | 1/2014 | Beste | H04L 41/0816 709/223 |
| 2014/0185598 | A1* | 7/2014 | Canpolat | H04W 48/16 370/338 |
| 2014/0290096 | A1* | 10/2014 | Wilson, III | A43B 9/12 36/84 |
| 2015/0245264 | A1* | 8/2015 | Xiong | H04L 67/2842 370/331 |
| 2015/0245335 | A1* | 8/2015 | Zhou | H04L 47/26 370/329 |
| 2015/0256992 | A1* | 9/2015 | Kelleman | H04W 8/005 370/254 |
| 2016/0127950 | A1* | 5/2016 | Gupta | H04W 48/16 370/255 |
| 2016/0165653 | A1* | 6/2016 | Liu | H04L 67/104 370/329 |
| 2017/0325092 | A1* | 11/2017 | Kneckt | H04W 76/14 |

OTHER PUBLICATIONS

WiFi Alliance, "Neighbor Awareness Networking Technical Specification," Version 1.0, 2015, pp. 1-98.
WiFi Alliance, "Wi-Fi Peer-to-Peer Services (P2Ps) Technical Specification (for Wi-Fi Direct® Services Certification)," Version 1.2, 2014, pp. 1-100.

* cited by examiner

US 10,659,948 B2

METHOD AND APPARATUS FOR PERFORMING DATA EXCHANGE BY NAN TERMINAL IN WIRELESS COMMUNICATION SYSTEM

CROSS REFERENCE TO RELATED APPLICATIONS

This application is the National Phase of PCT International Application No. PCT/KR2016/014868, filed on Dec. 19, 2016, which claims priority under 35 U.S.C. 119(e) to U.S. Provisional Applications Nos. 62/268,521 and 62/387,400, filed respectively on Dec. 17, 2015 and Dec. 24, 2015, all of which are hereby expressly incorporated by reference into the present application.

TECHNICAL FIELD

The present specification relates to a wireless communication system, and more particularly, to a method for a NAN (Neighbor Awareness Networking) terminal to perform data exchange in a wireless communication system and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

DISCLOSURE OF THE INVENTION

Technical Tasks

An object of the present specification is to provide a method for a NAN terminal to perform data exchange in a wireless communication system and an apparatus therefor.

Another object of the present specification is to provide a method for a NAN terminal to provide protocol information and port information necessary for exchanging data in a wireless communication system.

The other object of the present specification is to provide a method for a NAN terminal to provide information necessary for exchanging data based on a service type in a wireless communication system.

Technical Solution

To achieve these and other advantages and in accordance with the purpose of the present invention, as embodied and broadly described, according to one embodiment, a method of performing data exchange, which is performed by a NAN (Neighbor Awareness Networking) terminal in a wireless communication system, includes the steps of performing, by a first NAN terminal, discovery on a first service using at least one of a publish message and a subscribe message, transmitting, by the first NAN terminal, a data request message for the discovered first service to a second NAN terminal, receiving, by the first NAN terminal, a data response message from the second NAN terminal, and performing, by the first NAN terminal, data exchange on the first service with the second NAN terminal. In this case, the data request message is transmitted based on a data request method called by the first NAN terminal and service protocol type information and port number information, which are returned as a return value based on the data request method, can be transmitted in a manner of being included in the data request message.

To further achieve these and other advantages and in accordance with the purpose of the present invention, according to a different embodiment, a first NAN terminal performing data exchange in a wireless communication system includes a reception module configured to receive information from an external device, a transmission module configured to transmit information to an external device, and a processor configured to control the reception module and the transmission module, the processor configured to perform discovery on a first service using at least one of a publish message and a subscribe message, the processor configured to control the transmission module to transmit a data request message for the discovered first service to a second NAN terminal, the processor configured to control the reception module to receive a data response message from the second NAN terminal, the processor configured to perform data exchange on the first service with the second NAN terminal. In this case, the data request message is transmitted based on a data request method called by the first NAN terminal and service protocol type information and port number information, which are returned as a return value based on the data request method, can be transmitted in a manner of being included in the data request message.

Following items can be commonly applied to a method of providing data in a wireless communication system and an apparatus therefor.

According to one embodiment of the present specification, a protocol type included in the service protocol type information may correspond to a TCP (Transmission Control Protocol) or a UDP (User Datagram Protocol) and the port number information can include a TCP port number or a UDP port number.

According to one embodiment of the present specification, the return value, which is returned based on the data request method, can further include information on a first service type.

According to one embodiment of the present specification, the information on the first service type may correspond to information indicating whether the data request message, which is transmitted based on the data request method, is transmitted by a unicast type or a multicast type.

According to one embodiment of the present specification, the data request message can include unicast address information or multicast address information based on the information on the first service type.

According to one embodiment of the present specification, the data response message corresponds to a message transmitted based on a data response method called by the second NAN terminal and service protocol type information and port number information, which are returned as a return value based on the data response method, can be transmitted in a manner of being included in the data response message.

According to one embodiment of the present specification, the return value, which is returned based on the data response method, can further include information on a second service type.

According to one embodiment of the present specification, the information on the second service type may correspond to information indicating a service providing type for the first service selected from among one-to-one type, one-to-many type, and many-to-many type.

According to one embodiment of the present specification, if the information on the second service type indicates the one-to-one type, unicast address information can be included in the data response message.

According to one embodiment of the present specification, if the information on the second service type indicates the one-to-many type or the many-to-many type, multicast address information can be included in the data response message.

Advantageous Effects

According to the present specification, it is able to provide a method for a NAN terminal to perform data exchange in a wireless communication system and an apparatus therefor.

According to the present invention, a NAN terminal can provide protocol information and port information necessary for exchanging data in a wireless communication system.

According to the present specification, a NAN terminal can provide information necessary for exchanging data based on a service type in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 8 is a diagram illustrating a discovery window, and the like;

BEST MODE

Mode for Invention

Figure 1:
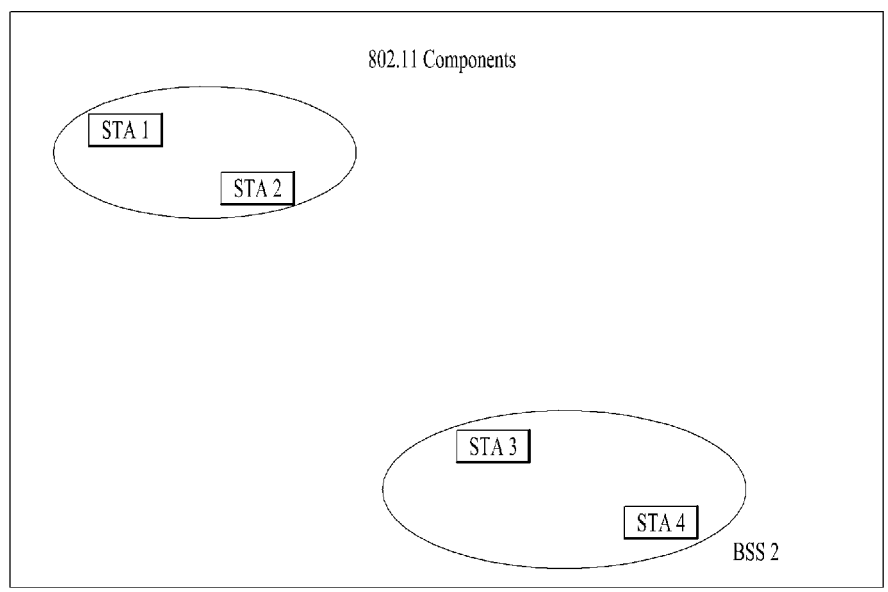
FIG. 1 is a diagram for an example of a structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/

GPRS/EDGE (Global System for Mobile communications)/ General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
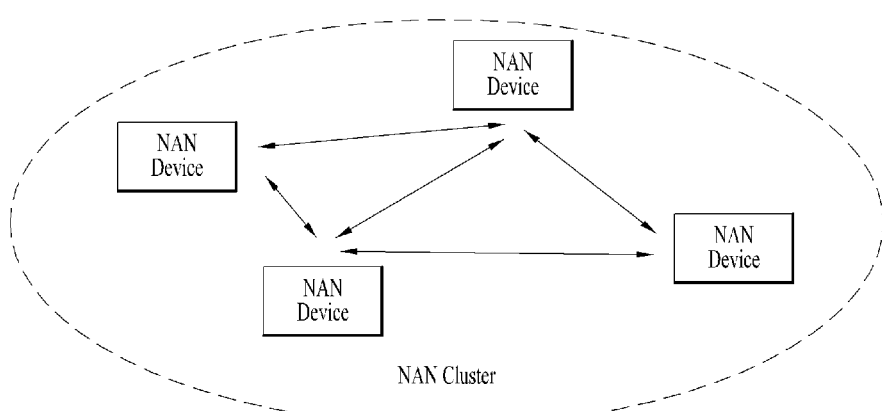
FIGS. 2 to 3 are diagrams for examples of a NAN cluster.
Figure 3:
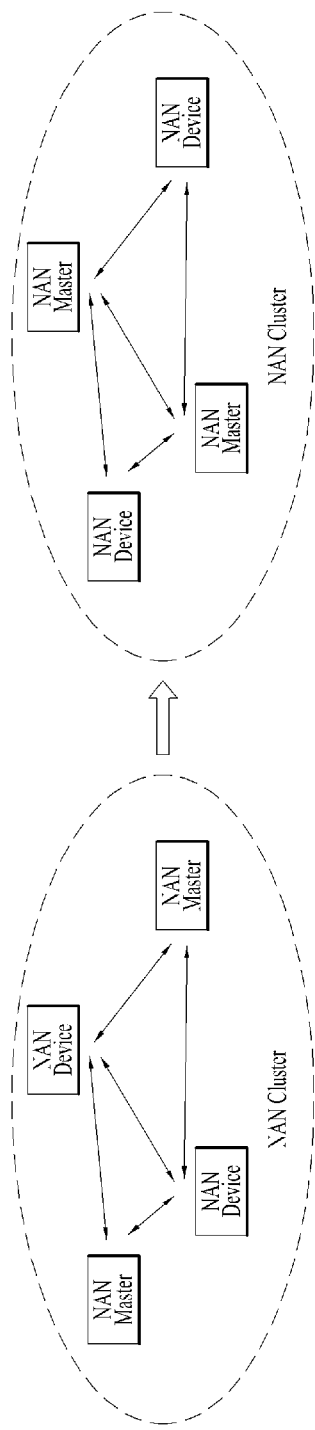

A NAN network can be constructed with NAN devices (devices) that use a set of identical NAN parameters (e.g., a time interval between consecutive discovery windows, an interval of a discovery window, a beacon interval, a NAN channel, etc.). A NAN cluster can be formed by NAN devices and the NAN cluster means a set of NAN devices that are synchronized on the same discovery window schedule. And, a set of the same NAN parameters is used in the NAN cluster. FIG. 2 illustrates an example of the NAN cluster. A NAN device included in the NAN cluster may directly transmit a multicast/unicast service discovery frame to a different NAN device within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
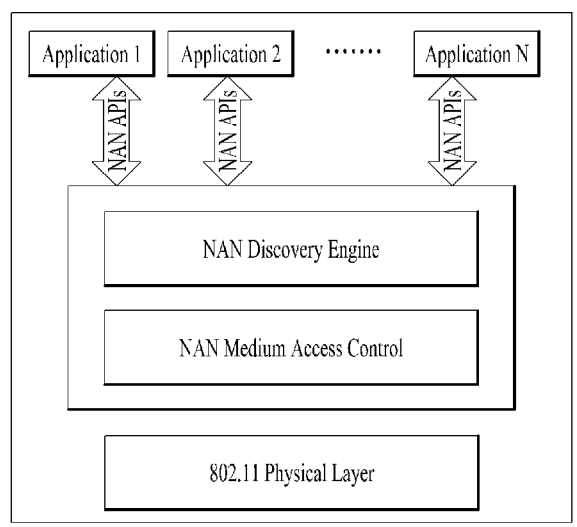
FIG. 4 is a diagram for an example of a structure of a NAN terminal.

FIG. 4 illustrates an example of a structure of a NAN device (device). Referring to FIG. 4, the NAN device is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
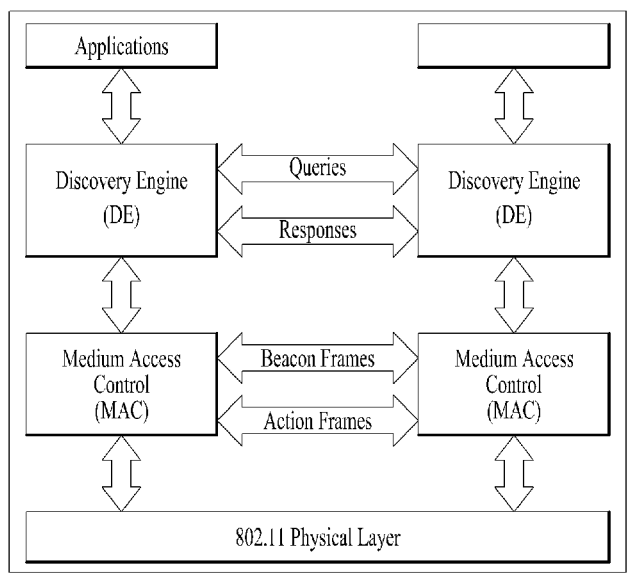
FIGS. 5 to 6 are diagrams illustrating a relation between NAN components.
Figure 6:
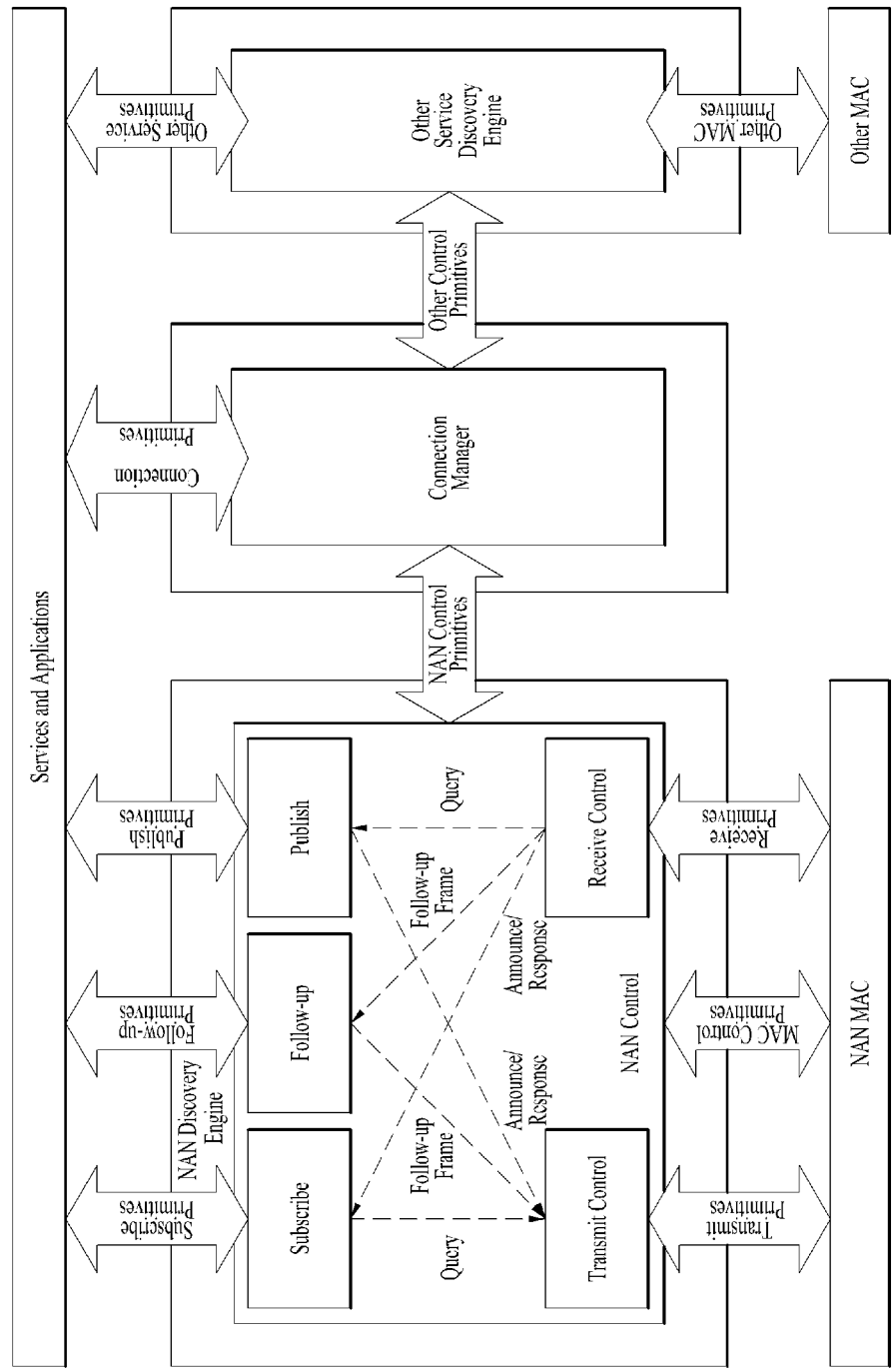

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
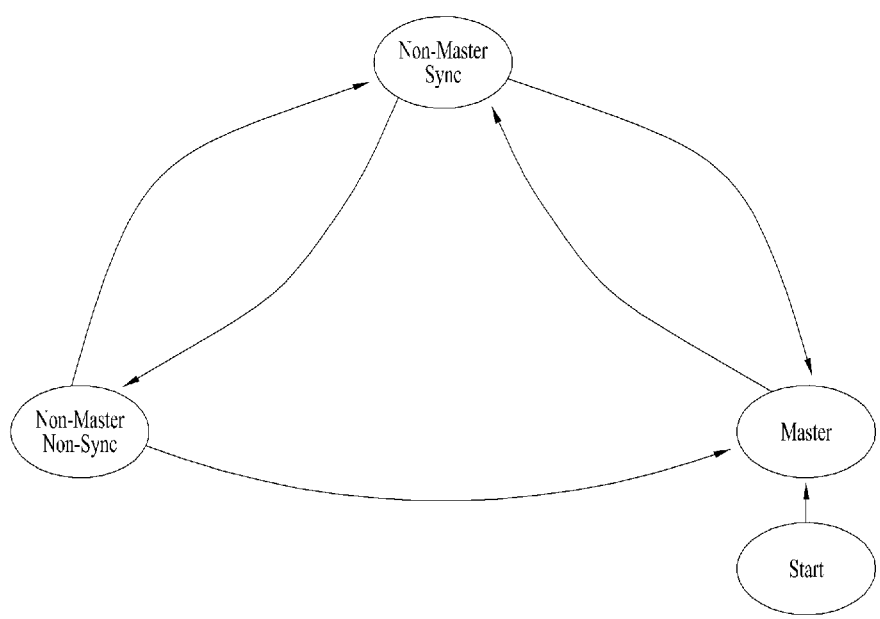
FIG. 7 is a diagram illustrating a state transition of a NAN terminal.

As mentioned in the foregoing description, a NAN device (device) can serve as a NAN master and the NAN master can be changed. In other words, roles and states of the NAN device can be shifted in various ways and related examples are illustrated in FIG. 7. The roles and states, which the NAN device can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
|---|---|---|
| Master | Transmission Possible | Transmission Possible |
| Non-Master Sync | Transmission Impossible | Transmission Possible |
| Non-Master Non-Sync | Transmission Impossible | Transmission Impossible |

The state of the NAN device can be determined according to a master rank (MR). The master rank indicates the preference of the NAN device to serve as the NAN master. In particular, a high master rank means strong preference for the NAN master. The NAN MR can be determined by Master Preference, Random Factor, Device MAC address, and the like according to Formula 1.

$$\text{MasterRank} = \text{MasterPreference}*2^{56} + \text{RandomFactor}*2^{48} + \text{MAC}[5]*2^{40} + \ldots + \text{MAC}[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
|---|---|---|---|
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN device that activates a NAN service and initiates a NAN cluster, each of the Master Preference and the Random Factor is set to 0 and NANWarmUp is reset. The NAN device should set a Master Preference field value in the master indication attribute to a value greater than 0 and a Random Factor value in the master indication attribute to a new value until when the NANWarmUp expires. When a NAN device joins a NAN cluster in which the Master Preference of an anchor master is set to a value greater than 0, the corresponding NAN device may set the Master Preference to a value greater than 0 and the Random Factor to a new value irrespective of expiration of the NANWarmUp.

Moreover, a NAN device can become an anchor master of a NAN cluster depending on an MR value. That is, all NAN devices have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN device becomes an anchor master of a currently existing NAN cluster, the NAN device adopts TSF used in the currently existing NAN cluster without any change.

The NAN device can become the anchor master in the following cases: if a new NAN cluster is initiated; if the master rank is changed (e.g., if an MR value of a different NAN device is changed or if an MR value of the anchor master is changed); or if a beacon frame of the current anchor master is not received any more. In addition, if the MR value of the different NAN device is changed or if the MR value of the anchor master is changed, the NAN device may lose the status of the anchor master. The anchor master can be determined according to an anchor master selection algorithm in the following description. In particular, the anchor master selection algorithm is the algorithm for determining which NAN device becomes the anchor master of the NAN cluster. And, when each NAN device joins the NAN cluster, the anchor master selection algorithm is driven.

If a NAN device initiates a new NAN cluster, the NAN device becomes the anchor master of the new NAN cluster. If a NAN synchronization beacon frame has a hop count in excess of a threshold, the NAN synchronization beacon frame is not used by NAN devices. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN device compares an anchor master rank value in the beacon frame with a stored anchor master rank value. If the stored anchor master rank value is greater than the anchor master value in the beacon frame, the NAN device discards the anchor master value in the beacon frame. If the stored anchor master value is less than the anchor master value in the beacon frame, the NAN device newly stores values greater by 1 than the anchor master rank and the hop count included in the beacon frame and an AMBTT value in the beacon frame. If the stored anchor master rank value is equal to the anchor master value in the beacon frame, the NAN device compares hop counters. Then, if a hop count value in the beacon frame is greater than a stored value, the NAN device discards the received beacon frame. If the hop count value in the beacon frame is equal to (the stored value−1) and if an AMBTT value is greater than the stored value, the NAN device newly stores the AMBTT value in the beacon frame. If the hop count value in the beacon frame is less than (the stored value −1), the NAN device increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN device exceeds the stored AMBTT value by more than 16*512 TUs (e.g., 16 DW periods), the NAN device may assume itself as an anchor master and then update an anchor master record. In addition, if any of MR related components (e.g., Master Preference, Random Factor, MAC Address, etc.) is changed, a NAN device not corresponding to the anchor master compares the changed MR with a stored value. If the changed MR of the NAN device is greater than the stored value, the corresponding NAN device may assume itself as the anchor master and then update the anchor master record.

Moreover, a NAN device may set anchor master fields of the cluster attributes in the NAN synchronization and discovery beacon frames to values in the anchor master record, except that the anchor master sets the AMBTT value to a TSF value of corresponding beacon transmission. The NAN device, which transmits the NAN synchronization beacon frame or the discovery beacon frame, may be confirmed that the TSF in the beacon frame is derived from the same anchor master included in the cluster attribute.

Moreover, a NAN device may adopt a TSF timer value in a NAN beacon received with the same cluster ID in the following case: i) if the NAN beacon indicates an anchor master rank higher than a value in an anchor master record of the NAN device; or ii) if the NAN beacon indicates an anchor master rank equal to the value in the anchor master record of the NAN device and if a hop count value and an AMBTT value in the NAN beacon frame are larger values in the anchor master record.

NAN Synchronization

NAN devices (devices) participating in the same NAN Cluster may be synchronized with respect to a common clock. A TSF in the NAN cluster can be implemented through a distributed algorithm that should be performed by all the NAN devices. Each of the NAN devices participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN devices may transmit synchronization beacon frames in order to help all NAN devices in the NAN cluster synchronize their own clocks.

NAN beacon transmission is distributed. A NAN beacon frame is transmitted during a DW period existing at every 512 TU. All NAN devices can participate in generation and transmission of the NAN beacon according to their roles and states. Each of the NAN devices should maintain its own TSF timer used for NAN beacon period timing. A NAN synchronization beacon interval can be established by the NAN device that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
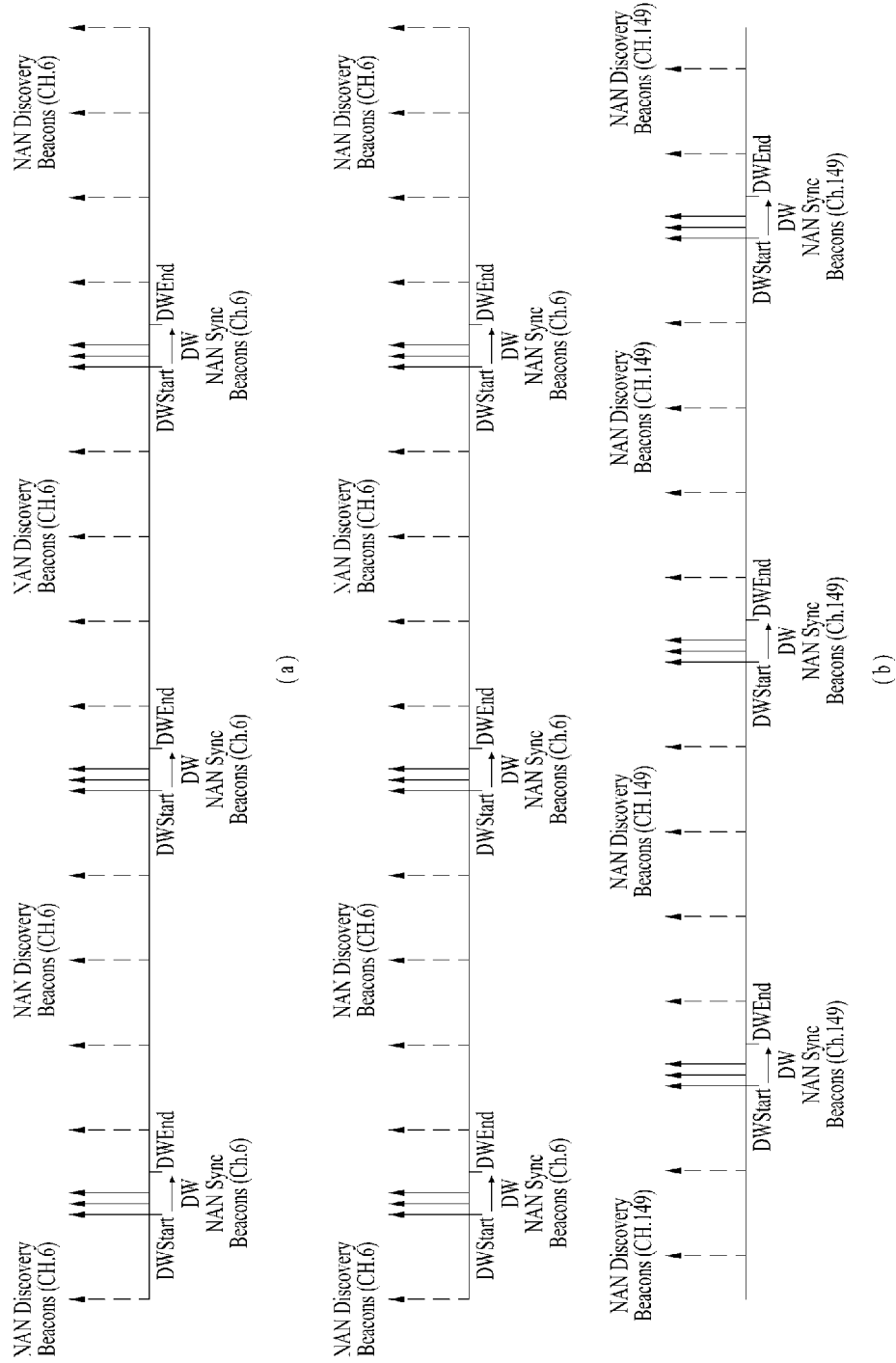

Each NAN device serving as a NAN master transmits a NAN discovery beacon frame from out of a NAN discovery window. On average, the NAN device serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN device participates, the NAN device serving as the NAN master is able to omit transmission of the NAN discovery beacon frame. In order to minimize power required to transmit the NAN discovery beacon frame, the NAN device serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8(a) shows transmission of NAN discovery and synchronization beacon frames of a NAN device operating in 2.4 GHz band. FIG. 8(b) shows transmission of NAN discovery and synchronization beacon frames of a NAN device operating in 2.4 GHz and 5 GHz bands.

Figure 9:
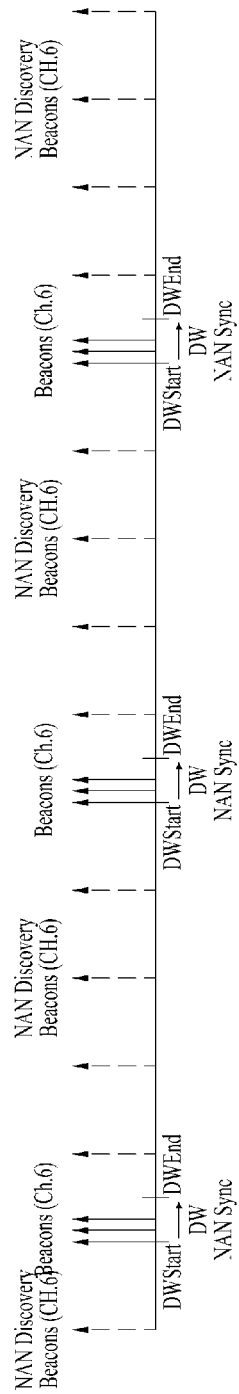
FIG. 9 is a diagram illustrating a discovery window.

FIG. 9 is a diagram illustrating a discovery window. As mentioned in the foregoing description, each NAN terminal performing a master role transmits a synchronization beacon frame within a discovery window and transmits a discovery beacon frame at the outside of the discovery window. In this case, as mentioned in the foregoing description, the discovery window can be repeated in every 512 TU. In this case, duration of the discovery window may correspond to 16 TUs. In particular, the discovery window can last during 16 TUs. In this case, for example, all NAN terminals belonging to a NAN cluster may awake at every discovery window to receive a synchronization beacon frame from a master NAN terminal. By doing so, the NAN cluster can be maintained. In this case, if all NAN terminals awake at every discovery window in a fixed manner, power consumption of the terminals may get worse. Hence, it is necessary to have a method of reducing power consumption by dynamically controlling duration of a discovery window while synchronization is maintained in a NAN cluster.

For example, as mentioned in the foregoing description, a NAN terminal may operate in 2.4 GHz band or 5 GHz band. As a different example, a NAN terminal may operate in sub 1 GHz band. For example, a NAN terminal can be configured to support IEEE 802.11ah that supports sub 1 GHz band. For example, if a NAN terminal supports 900 MHz, it may have link quality and a physical model different from link quality and a physical model in 2.4 GHz or 5 GHz.

For example, if a NAN terminal supports 900 MHz, the NAN terminal can send a signal farther and perform communication in a wider range. In this case, data communication can be performed between NAN terminals and data can be exchanged between NAN terminals. In this case, since the data exchange is performed based on the data communication, a problem may exist in efficiently managing power in the NAN terminal. In order to solve the problem, it may differently configure a method of configuring a discovery window period. FIG. 9 shows a basic structure that a synchronization beacon frame is transmitted within a discovery window and a discovery beacon frame is transmitted at the outside of the discovery window. The basic structure can also be similarly applied to a NAN terminal supporting 900 MHz band.

Figure 10:
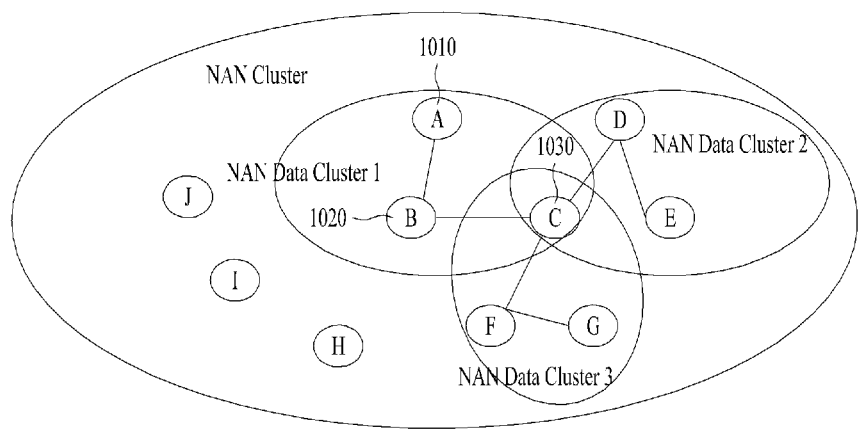
FIG. 10 is a diagram illustrating a method of forming a NAN data cluster.

FIG. 10 is a diagram illustrating a method of forming a NAN data cluster.

As mentioned in the foregoing description, data can be exchanged between NAN terminals. In this case, when communication is performed between the NAN terminals, service discovery and data communication for the service have been supported in a state that there is no NAN terminal playing a role of a legacy access point (AP) or a group owner (GO). In particular, unlike the AP or the GO, there is no NAN terminal playing a role of transmitting a beacon frame with a prescribed period. In this case, the AP or the GO transmits a beacon frame to inform a UE of the existence of the AP or the GO and update a parameter for a data/system based on whether or not there is traffic. Hence, when communication is performed between NAN terminals, it is necessary to have a terminal configured to control a parameter to be updated based on traffic. And, for example, when communication is performed between NAN terminals, it is necessary to control a scheduling method for exchanging data between the NAN terminals, a time synchronization acquisition method, a method of transmitting a paging message, and the like. Regarding this, it shall be described later.

For example, NAN terminals can perform a setup procedure for performing data communication and the data communication between discovery windows (DWs). In this case, a NAN data path may correspond to a path at which the NAN terminals perform data exchange between the DWs.

More specifically, two NAN terminals can establish a NAN data link (NDL) between the NAN terminals. In this case, the two NAN terminals can perform data exchange on a NAN data path based on the NAN data link. For example, it may be able to form a separate NDL schedule for the NAN data link between the two NAN terminals. Regarding the separate NDL schedule, it shall be described later.

And, the NAN terminals can form a NAN data cluster (NDC). In this case, the NAN data cluster may correspond to a set of NAN terminals having at least one or more NAN data links. In this case, the NAN terminals belonging to the NAN data cluster may have a common NDC schedule. In this case, an NDL schedule may correspond to a superset of the NDC schedule. In particular, when a plurality of NAN terminals establish a NAN data link, a plurality of the NAN terminals may have an NDC schedule as a schedule common to a plurality of the NAN terminals. And, for example, when the NAN data cluster operates based on an identical service, a service provider NAN terminal may exist in the NAN data cluster. And, a scheduler NAN terminal playing a role in managing a schedule may exist in the NAN data cluster. In this case, for example, the scheduler NAN terminal may be able to perform a role similar to a role of the aforementioned AP or the GO. Regarding this, it shall be described later.

For example, referring to FIG. 10, a plurality of NAN terminals may exist in a NAN cluster. In this case, a first NAN terminal 1010 (A) and a second NAN terminal 1020 (B) may have a NAN data link. And, the second NAN terminal 1020 (B) and a third NAN terminal may have a NAN data link. In this case, the first NAN terminal 1010, the second NAN terminal 1020, and the third NAN terminal 1030 may have a single NAN data cluster. An NDL schedule of the first NAN terminal 1010 and the second NAN terminal 1020 and an NDL schedule of the second NAN terminal 1020 and the third NAN terminal 1030 may have a common NDC schedule. In particular, the first NAN terminal 1010, the second NAN terminal 1020, and the third NAN terminal 1030 included in the same NAN data cluster may have the common NDC schedule. And, a different NAN data cluster can be formed in a NAN cluster. And, NAN terminals can be included in a plurality of NAN data links and a plurality of NAN data clusters. For example, the third NAN terminal 1030 (C) can be included in a plurality of data clusters, by which the present invention may be non-limited.

Figure 11:
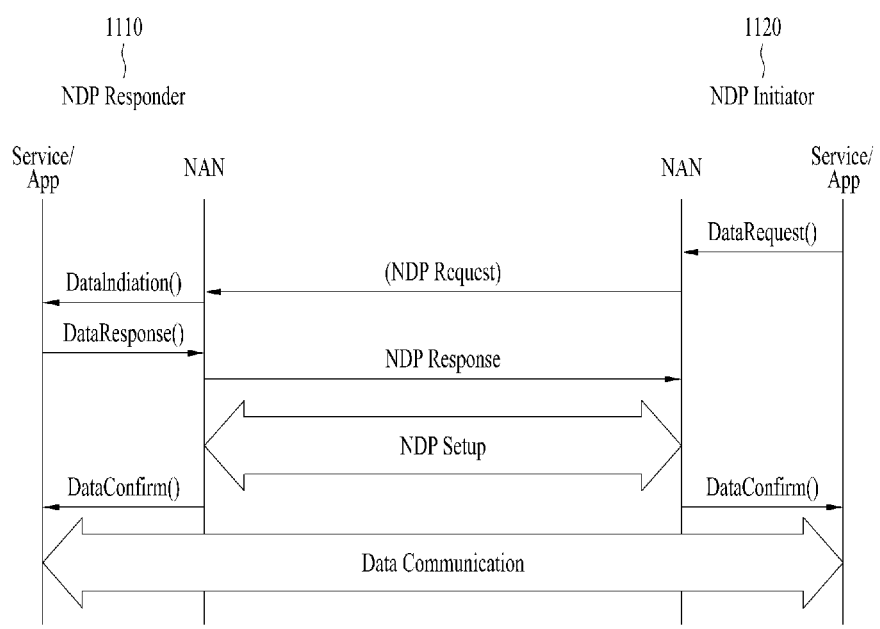
FIG. 11 is a flowchart illustrating a method of establishing a NAN data path.

FIG. 11 is a flowchart illustrating a method of establishing a NAN data path.

As mentioned in the foregoing description, two NAN terminals can configure a NAN data path based on a NAN data link. In this case, for example, one of the two NAN terminals may correspond to an NDP responder NAN terminal (NDP responder) 1110 and another may corresponds to an NDP initiator NAN terminal (NDP initiator) 1120. In particular, a NAN terminal intending to initiate to establish a data path corresponds to the NDP initiator and a responding NAN terminal may correspond to the NDP responder.

In this case, for example, a service/application layer of the NDP initiator 1120 can call a data request (DataRequest( )) method to NAN DE and MAC layer. If the data request method is called, the NDP initiator 1120 can transmit an NDP request to the NDP responder 1110. In this case, NAN DE and NAN MAC layer of the NDP responder 1110 can call a data indication (DataIndication( )) event to a service/application layer. Subsequently, the service/application layer of the NDP responder 1110 can call a data response (DataResponse( )) method to the NAN DE and the NAN MAC layer. In this case, the NDP responder 1110 can transmit an NDP response to the NDP initiator 1120. Subsequently, the NDP responder 1110 and the NDP initiator 1120 can perform NDL setup.

For example, the NDL setup can be performed via an NDL schedule. Subsequently, the NDP responder 1110 and the NDP initiator 1120 can call a data confirm (DataConfirm ( )) event. Subsequently, the NDP responder 1110 and the NDP initiator 1120 can perform data communication. By doing so, the two NAN terminals belonging to the NAN cluster can perform data exchange, by which the present invention may be non-limited. Regarding parameters for the methods and the event, it shall be described later.

Figure 12:
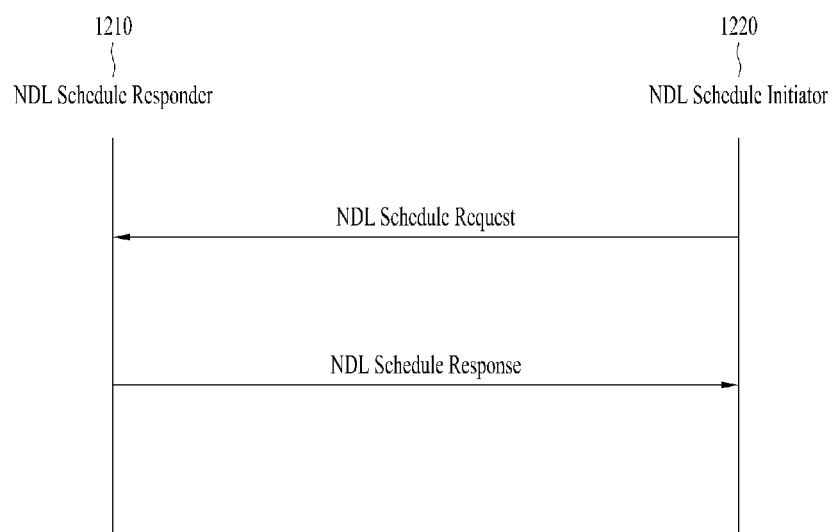
FIG. 12 is a flowchart illustrating a method of configuring an NDL schedule.

FIG. 12 is a flowchart illustrating a method of configuring an NDL schedule.

As mentioned in the foregoing description, two NAN terminals can exchange a message for establishing a NAN data path each other. In this case, for example, one of the two NAN terminals may correspond to an NDL schedule initiator NAN terminal (NDL schedule initiator) 1220 and another may corresponds to an NDL schedule responder NAN terminal (NDL schedule responder) 1210. For example, the aforementioned NDP initiator corresponds to the NDL schedule initiator and the NDP responder may correspond to the NDL schedule responder.

In this case, the NDL schedule initiator 1220 can select an NDC schedule for an NDL schedule. For example, the NDL schedule initiator 1220 may form a new NAN data cluster to select the NDC schedule. In this case, a new NAN cluster can be formed by the NDL schedule initiator 1220. And, for example, the NDL schedule initiator 1220 can select one from among NDC schedules of a NAN data cluster to which the NDL schedule initiator 1220 belongs thereto. If an NDC schedule is selected, the NDL schedule initiator 1220 can transmit an NDL schedule request to the NDL schedule responder 1210. Subsequently, the NDL schedule responder 1210 can transmit an NDL schedule response to the NDL schedule initiator 1220. By doing so, the NDL schedule initiator 1220 and the NDL schedule responder 1210 can configure an NDL schedule.

Figure 13:
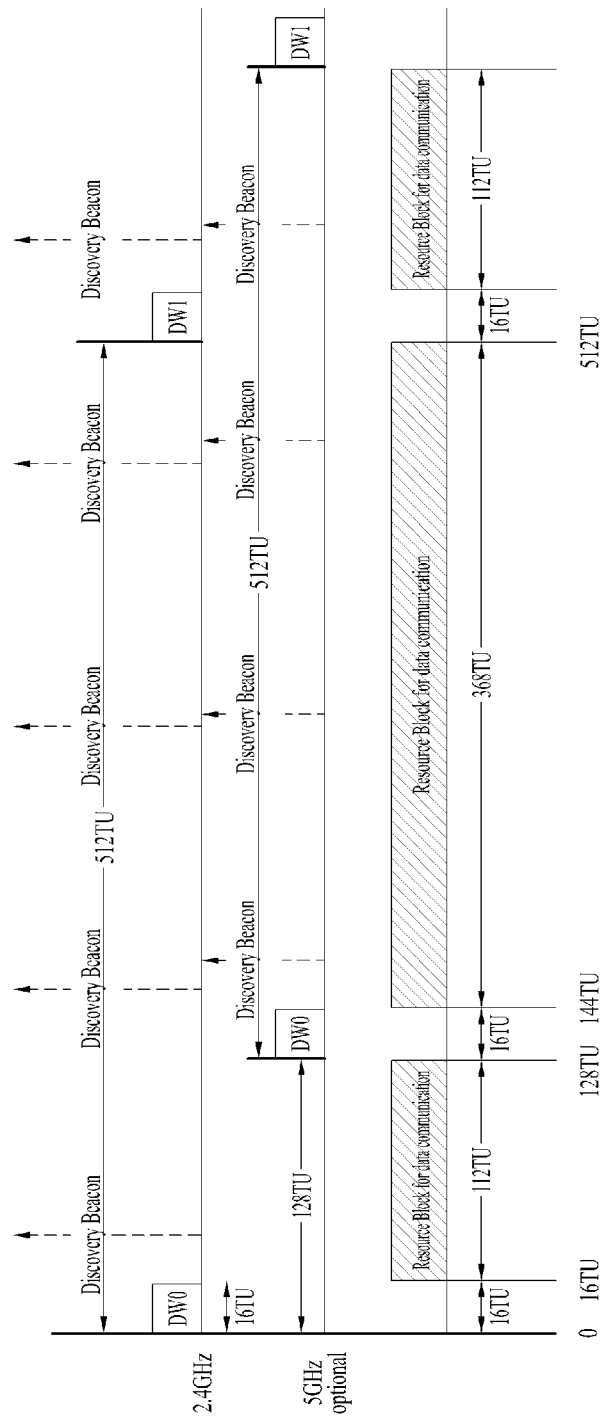
FIG. 13 is a diagram illustrating a method for a NAN terminal to operate based on NDL and NDC.

FIG. 13 is a diagram illustrating a method for a NAN terminal to operate based on NDL and NDC.

As mentioned in the foregoing description, NAN terminals may have a NAN data link and a NAN data cluster. In this case, the NAN terminals can exchange information for data exchange each other via an NDL schedule corresponding to a schedule for the NAN data link. And, the NAN terminals belonging to the NAN data cluster can exchange information on the data cluster and information on data exchange via an NDC schedule corresponding to a schedule for the NAN data link. In this case, as mentioned in the foregoing description, the NDL schedule may correspond to a superset of the NDC schedule.

Specifically, referring to FIG. 13, NAN terminals can operate on 2.4 GHz and/or 5 GHz. In this case, as mentioned in the foregoing description, the NAN terminals can perform synchronization or exchange a frame in a discovery window. In this case, the NAN terminals can transmit data between discovery windows. In particular, a resource block for data communication can be configured between discovery windows. In this case, the NAN terminals may have an NDL schedule and an NDC schedule in the resource block configured between the discovery windows. And, the NAN terminals can perform data communication in the resource block configured between the discovery windows.

For example, the NDL schedule may have one or a plurality of time blocks between the discovery windows. In this case, the time block can be configured by a bundle of a plurality of contiguous slots in a unit of 16 TU. In this case, when two NAN terminals form an NDL, the two NAN terminals can share information on time and a channel on which the terminals operate via NDL schedule negotiation. In particular, information necessary for the two NAN terminals to perform data communication can be exchanged in the NDL schedule. Hence, the two NAN terminals can update information on whether or not the NAN terminals exist and relevant parameter information via the NDL schedule for a NAN data path and a NAN data link. In this case, if one of the NAN terminals transmits a message only, CCA (clear channel assessment) is performed without contention. If a channel is idle, the NAN terminal can transmit a message. If a plurality of NAN terminals transmit a message, a contention window (CW) value is configured in advance to transmit a message.

For example, it may be able to determine a scheduler NAN terminal for the NDL schedule and a non-scheduler NAN terminal. The two NAN terminals can determine the scheduler NAN terminal and the non-scheduler NAN terminal based on the aforementioned NDL schedule request and the NDL schedule response. In particular, the two NAN terminals can determine the scheduler NAN terminal and the non-scheduler NAN terminal via negotiation, by which the present invention may be non-limited.

Figure 14:
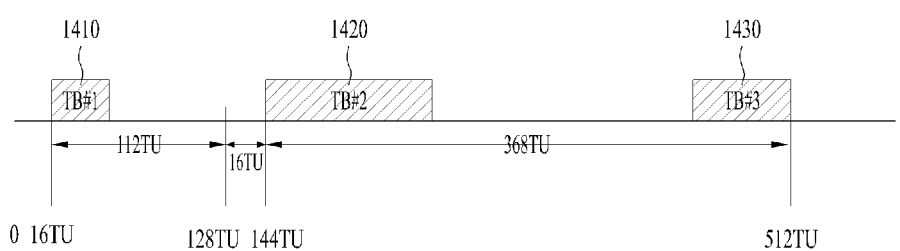
FIG. 14 is a diagram illustrating a method for a NAN terminal to operate based on NDL and NDC.

FIG. 14 is a diagram illustrating a method for a NAN terminal to operate based on NDL and NDC.

As mentioned in the foregoing description, NAN terminals can perform data exchange between discovery windows. In this case, referring to FIG. 14, a section ranging from 0 TU to 16 TU may correspond to a discovery window section. In this case, for example, a discovery window ranging from 0 TU to 16 TU may correspond to a discovery window related to an operation on 2.4 GHz. And, a section ranging from 128 TU to 144 TU may also correspond to a discovery window section. In this case, for example, a discovery window ranging from 128 TU to 144 TU may correspond to a discovery window related to an operation on 5 GHz. A cycle is completed at 512 TU and a next discovery window section may appear. In this case, time blocks 1410, 1420, and 1430 can be configured between the discovery windows.

In this case, an NDL schedule can be configured in the time blocks 1410, 1420, and 1430. In particular, the time blocks 1410, 1420, and 1430 may correspond to time blocks for the NDL schedule. In this case, as mentioned in the foregoing description, data can be exchanged between NAN terminals in a different section between the discovery windows. For example, the two NAN terminals can perform data exchange after a time block corresponding to the NDL schedule. In particular, the NDL schedule can be configured to exchange necessary information before data is exchanged between the two NAN terminals. And, one of the time blocks 1410, 1420, and 1430 can be configured as a time block for an NDC schedule. In this case, information commonly applied in a NAN data cluster can be exchanged in the NDC schedule.

Figure 15:
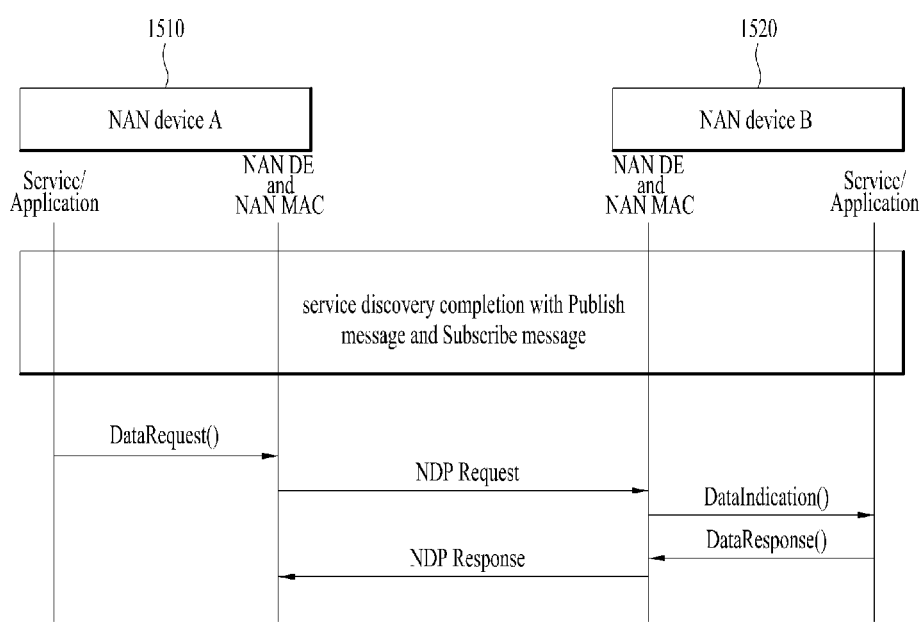
FIG. 15 is a flowchart illustrating a method for NAN terminals to perform data exchange after service discovery is completed.

FIG. 15 is a flowchart illustrating a method for NAN terminals to perform data exchange after service discovery is completed.

As mentioned in the foregoing description, NAN terminals can perform data exchange based on a NAN data link and a NAN data cluster. In this case, referring to FIG. 11, a service/application layer of one NAN terminal calls a data request method (DataRequest( ) method) to NAN DE and NAN MAC layers and can transmit an NDP request message to another NAN terminal.

For example, parameters included in the data request method are shown in Table 3 in the following. In this case, since the data request method is used for transmitting the NDP request message, information necessary for the NAN terminals to exchange data can be included in the data request method as parameters.

In this case, for example, the NDP ID corresponds to a value known to 0 and can be allocated to a NAN DE for a NAN data path. The NDP ID may correspond to an independent value necessary for a terminal to temporarily identify NDP. And, the initiator data address may correspond to a data interface address of a terminal that initiates NDP. In particular, if the data request method is called, the NDP ID and the initiator data address are provided to a service layer as a return value and the NDP ID and the initiator data address can be transmitted to a responder NAN terminal via the data request message, by which the present invention may be non-limited.

TABLE 3

DataRequest(publish_id, responder_nan_address, qos_requirements, security, service_specific_info)
    publish_id
        Identifier for the instance of the Publisher function associated with the NDP setup request
    responder_nan_address
        The NDP Responder's NAN MAC address
    qos_requirements
        QoS Stream ID: identifies this QoS Stream.
        Nominal MSDU Size (Mandatory): contains an unsigned integer that specifies the nominal size, in octets, of MSDUs or A-MSDUs belonging to the stream.
        Mean Data Rate (Mandatory): indicates the average data rate specified at the MAC for transport of MSDUs or A-MSDUs belonging to this stream.
        Maximum Service Interval (O): specifies the latency limit in the case that aggregated packets are used.
            Suspension Interval (O): contains an unsigned integer that specifies the minimum amount of time, in microseconds, that may elapse without arrival or transfer of an MSDU belonging to the QoS Stream before the generation of successive QoS(+)CF-Poll is stopped for this QoS Stream.
            Minimum Data Rate (O): indicates the lowest data rates specified at the MAC for transport of MSDUs or A-MSDUs belonging to this stream.
            Burst Size (O): contains an unsigned integer that specifies the maximum burst of the MSDUs or A-MSDUs belonging to this stream.
            Peak Data Rate (O): indicates the maximum allowable data rate specified at the MAC for transport of MSDUs or A-MSDUs belonging to this stream.
            Delay Bound (O): contains an unsigned integer that specifies the maximum amount of time, in microseconds, allowed to transport an MSDU or A-MSDU belonging to the stream
    security (TBD)
    service_specific_Info
        Sequence of values which are to be transmitted in the frame body For example, if the data request method is called, an NDP ID (NDP_ID) and an initiator data address (Initiator_data_address) are provided to the service layer as a return value and the aforementioned information can be transmitted in a manner of being included in a data request message.

The responder NAN terminal can call a data response method (DataResponse( ) Method). In this case, for example, the data response method can be represented as Table 4 in the following.

TABLE 4

DataResponse (status, ndp_id, initiator_data_address, qos_requirements, security, service_specific_info)
    status
        Decision (Accept/Reject/Defer)
        Reason Code
    ndp_id
        Identifier for the instance of the NDP
    initiator_data_address
        The NDP Initiator's data interface address for the NDP
    qos_requirements
        QoS Stream ID: identifies this QoS Stream.
        Nominal MSDU Size (Mandatory): contains an unsigned integer that specifies the nominal size, in octets, of MSDUs or A-MSDUs belonging to the stream.
        Mean Data Rate (Mandatory): indicates the average data rate specified at the MAC for transport of MSDUs or A-MSDUs belonging to this stream.
        Maximum Service Interval (O): specifies the latency limit in the case that aggregated packets are used.
            Suspension Interval (O): contains an unsigned integer that specifies the minimum amount of time, in microseconds, that may elapse without arrival or transfer of an MSDU belonging to the QoS Stream before the generation of successive QoS(+)CF-Poll is stopped for this QoS Stream.

TABLE 4-continued

Minimum Data Rate (O): indicates the lowest data rates specified at the MAC for transport of MSDUs or A-MSDUs belonging to this stream.
    Burst Size (O): contains an unsigned integer that specifies the maximum burst of the MSDUs or A-MSDUs belonging to this stream.
    Peak Data Rate (O): indicates the maximum allowable data rate specified at the MAC for transport of MSDUs or A-MSDUs belonging to this stream.
    Delay Bound (O): contains an unsigned integer that specifies the maximum amount of time, in microseconds, allowed to transport an MSDU or A-MSDU belonging to the stream.
  security (TBD)
  service_specific_Info
    Sequence of values which are to be transmitted in the frame body In this case, for example, referring to FIG. 15, a first NAN terminal 1510 and a second NAN terminal 1520 can complete a service discovery for a specific service via a publish and/or subscribe message. In particular, the first NAN terminal 1510 and the second NAN terminal 1520 may be in a state of being ready to perform communication for the specific service. In this case, for example, the first NAN terminal 1510 may be able to call the aforementioned data request method as an initiator NAN terminal. In this case, the first NAN terminal 1510 returns the NDP ID and the initiator data address to the service layer as a return value in response to the data request method and can transmit the NDP ID and the initiator data address to the second NAN terminal 1520 by including the NDP ID and the initiator data address in a data request message. In this case, for example, the data request message can include information on parameters of the data request method. Having received the data request message, the second NAN terminal 1520 can provide information on a data request to a service/application layer via a data indication event (DataIndication ( )). Subsequently, the second NAN terminal 1520 calls the aforementioned data response method and can transmit a data response message to the first NAN terminal 1510 based on the data response method.

In this case, for example, if the data request method is called, NAN DE can return information on Table 5 described in the following to the service/application layer as a return value. And, the data request message can further include the information on Table 5. In particular, in order to perform data exchange for a service, information on a protocol type for the service and information on a port number can be included in the data request message as a return value. In this case, when NAN terminals perform service discovery via a publish and/or a subscribe message, the information on the protocol type for the service and the information on the port number may not be exchanged. Hence, it is necessary for the NAN terminals to exchange the information on the protocol type for the service and the information on the port number to smoothly perform data communication on the service.

In particular, if a NAN terminal calls the data request method, service protocol type information and port number information are returned as a return value and the information can be transmitted to a responder NAN terminal in a manner of being included in the data request message.

In this case, for example, the service protocol type information and the port number information can be returned as a return value only when a data request method is firstly called after discovery for a specific service is completed. In particular, the service protocol type information and the port number information can be returned based on a method which is called at the timing at which data exchange starts after discovery for a specific service is completed.

A data response method can be processed by the same way. For example, if the data response method is called, NAN DE can return information on Table 5 described in the following to a service/application layer as a return value. And, the information on Table 5 can be further included in a data response message. In particular, in order to perform data exchange for a service, information on a protocol type for the service and information on a port number can be further included in the data response message as a return value. In this case, when NAN terminals perform service discovery via a publish and/or a subscribe message, the information on the protocol type for the service and the information on the port number may not be exchanged. Hence, it is necessary for the NAN terminals to exchange the information on the protocol type for the service and the information on the port number to smoothly perform data communication on the service.

In particular, if a NAN terminal calls the data response method, service protocol type information and port number information are returned as a return value and the information can be transmitted to a responder NAN terminal in a manner of being included in the data response message.

In this case, for example, the service protocol type information and the port number information can be returned as a return value only when a data response method is firstly called after discovery for a specific service is completed. In particular, the service protocol type information and the port number information can be returned based on a method which is called at the timing at which data exchange starts after discovery for a specific service is completed.

TABLE 5

Service protocol type :
    TCP(Transmission Control Protocol) or UDP(User Datagram Protocol)
Port number :
    TCP port number or UDP port number And, for example, a parameter indicating information on a service type can be further included in the data request method and the data response method as information on a service. In this case, for example, the information on the service type can be determined according to whether a service is transmitted by unicast or multicast. For example, when NAN terminals perform data exchange on a specific service, the data can be transmitted by a unicast type or a multicast type. In this case, it is necessary to differently configure a data interface address according to a data transmission type. In particular, if the data is transmitted according to the unicast type, a unicast address can be configured as a data interface address. In this case, for example, the unicast address may correspond to IPv6 unicast address. If the data is transmitted according to the multicast type, a multicast address can be configured as a data interface address. In this case, for example, if a data request method is called, an initiator NAN terminal returns a unicast address or a multicast address as a return value based on a parameter indicating a service type included in the data request method and can transmit the unicast address or the multicast address by including the address in the data request message. Similarly, for example, if a data response method is called, a responder NAN terminal returns a unicast address or a multicast address as a return value based on service type information which is included as a parameter of the data response method and can transmit the unicast address or the multicast address by including the address in the data response message.

In relation to this, for example, if the service type indicates the multicast type, a data interface address as a return value is not returned to a service layer. The data interface address can be returned only when the service type indicates the unicast type, by which the present invention may be non-limited.

As mentioned in the foregoing description, if the data request method or the data response method is called, protocol information on a service, port number information, address information and the like can be returned as a return value. For example, the return value is shown in Table 6 described in the following. In particular, different information can be included according to a service type, by which the present invention may be non-limited. In this case, information on Table 6 can be included in a message corresponding to each of the methods. And, for example, the aforementioned messages can further include a combination of information shown in Table 7 in the following, by which the present invention may be non-limited.

TABLE 6

| | Return Value |
|---|---|
| Unicast | IPv6 link local address and/or TCP/UDP and/or Port number |
| Multicast | IPv6 multicast address and/or port number |

TABLE 7

| |
|---|
| IPv6 link local address |
| IPv6 multicast address |
| IPv6 Ethernet multicast address |

As a different example, a service can be configured by one of types shown in Table 8 in the following as information on a service type. For example, the service may correspond to type information on a provided method. In this case, referring to Table 8, one-to-one type may correspond to a type that there is one service provider NAN terminal and there is one service receiver NAN terminal. In particular, the one-to-one type may correspond to a case that one NAN terminal performs communication with another NAN terminal on a service. In this case, for example, according to the one-to-one type, unicast address information can be transmitted in a manner of being included in a message corresponding to a data request method or a data response method.

And, for example, one-to-many type may correspond to a type that there is one service provider and there are a plurality of service receivers. In this case, if the service provider corresponds to a publisher, the service provider can inform a subscriber of "IPv6 multicast address" and/or "IPv6 Ethernet multicast address" by including the "IPv6 multicast address" and/or "IPv6 Ethernet multicast address" in a message corresponding to a data response method. In particular, when a data response method is called by receiving a data request message, if the one-to-many type is used, multicast address information can be transmitted in a manner of being included in a data response message.

As a different example, in case of using many-to-many type, both a subscriber and a publisher can transmit multicast address information by including the multicast address information in a corresponding message, by which the present invention may be non-limited. And, for example, information on Table 8 described in the following can be exchanged in a manner of being defined as a parameter of a publish and/or subscribe method. In particular, when discovery is performed on a service, if a message corresponding to the publish method and/or the subscribe method is transmitted, the information on Table 8 can be transmitted in a manner of being included in the message.

As a further different example, the information on Table 8 can be exchanged between NAN terminals in a manner of being included in a procedure of exchanging the information when data setup is performed. In particular, the NAN terminals can obtain the information on Table 8 in advance. When the data request method and/or the data response method is called, the NAN terminals can include corresponding address information based on the information on Table 8, by which the present invention may be non-limited.

TABLE 8

| Type of providing service |
|---|
| one-to-one |
| one-to-many |
| many-to-many |

Figure 16:
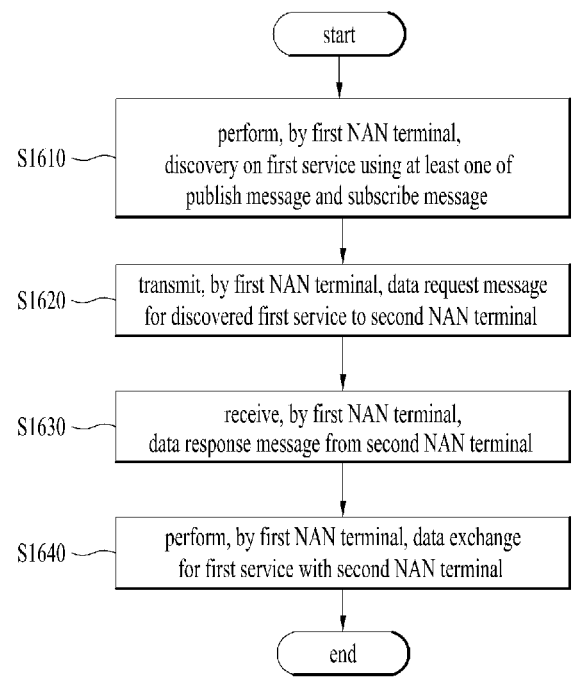
FIG. 16 is a flowchart illustrating a method for a NAN terminal to perform data exchange.

FIG. 16 is a flowchart illustrating a method for a NAN terminal to perform data exchange. A first NAN terminal can perform discovery on a first service using at least one of a publish message and a subscribe message [S1610]. In this case, as mentioned earlier in FIGS. 10 to 15, the first NAN terminal and a second NAN terminal may correspond to terminals operating based on a NAN interface. In this case, the first NAN terminal and the second NAN terminal can perform service discovery on the first service corresponding to a specific service. In this case, for example, when the first NAN terminal and the second NAN terminal uses the NAN interface, as mentioned in the foregoing description, the first NAN terminal and the second NAN terminal can perform the service discovery by including information on the service in the publish message or the subscribe message and exchanging the information.

Subsequently, the first NAN terminal can transmit a data request message for the discovered first service to the second NAN terminal [S1620]. And, the first NAN terminal can receive a data response message from the second NAN terminal [S1630]. In this case, as mentioned earlier in FIGS. 10 to 15, the first NAN terminal calls a data request method and may be then able to transmit a data request message to the second NAN terminal as a message corresponding to the data request method. Having received the data request message, the second NAN terminal calls a data response method and may be then able to transmit a data response message to the first NAN terminal as a message corresponding to the data response method. In this case, for example, when the data request method or the data response method is called, a return value is returned and the return value can be transmitted in a manner of being included in the data request message or the data response message. In this case, the return value corresponds to information on Table 5 and service protocol type information and port number information can be included in the information. For example, as mentioned in the foregoing description, when the first NAN terminal and the second NAN terminal performs discovery on the service, the first NAN terminal and the second NAN terminal may not exchange the service protocol type information and the port number information. In particular, in order for the first NAN terminal and the second NAN terminal to exchange data for a specific service, it is necessary to additionally have information on a service protocol type and information on a port number. In this case, the abovementioned information is returned as a return value of the data request method or the data response method and the information can be transmitted in a manner of being included in a message corresponding to each of the data request method and the data response method, by which the present invention may be non-limited.

Subsequently, the first NAN terminal and the second NAN terminal can exchange the data for the first service [S1640]. In this case, as mentioned earlier in FIGS. 10 to 15, the first NAN terminal and the second NAN terminal can exchange data for a specific service using the information included in the data request message and the data response message, by which the present invention may be non-limited.

Figure 17:
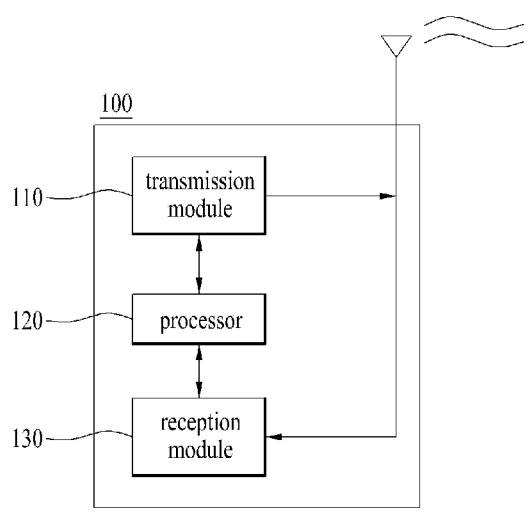
FIG. 17 is a block diagram for a terminal device.

FIG. 17 is a block diagram for a terminal device.

A terminal device may correspond to a NAN terminal. In this case, the terminal device 100 can include a transmission module 110 configured to transmit a radio signal, a reception module 130 configured to receive a radio signal, and a processor configured to control the transmission module 110 and the reception module 130. In this case, the terminal 100 can perform communication with an external device using the transmission module 110 and the reception module 130. In this case, the external device may correspond to a different terminal device. And, the external device may correspond to a base station. In particular, the external device may correspond to a device capable of performing communication with the terminal device 100, by which the present invention may be non-limited. The terminal device 100 can transmit or receive digital data such as contents and the like using the transmission module 110 and the reception module 130. And, the terminal device 100 can exchange a beacon frame, a service discovery frame, a NAN management frame, and the like using the transmission module 110 and the reception module 130, by which the present invention may be non-limited. In particular, the terminal device 100 performs communication using the transmission module 110 and the reception module 130 and may be able to exchange information with an external device.

According to one embodiment of the present specification, the processor 120 of the terminal device 100 can perform discovery on a specific service using at least one of a publish message and a subscribe message. In this case, as mentioned earlier in FIGS. 10 to 16, the terminal device 100 can perform discovery on a specific service using at least one of a publish message and a subscribe message using a NAN interface, by which the present invention may be non-limited.

Subsequently, the processor 120 can transmit a data request message for a specific service to a different NAN terminal using the transmission module 110. In this case, the processor 120 can receive a data response message in response to the data request message using the reception module 130. Subsequently, the processor 120 can exchange data for the specific service with the different terminal.

In this case, for example, as mentioned in the foregoing description, the processor 120 calls a data request method and can transmit a data request message to a different NAN terminal as a message corresponding to the data request method. Having received the data request message, the different NAN terminal calls a data response method and can transmit a data response message as a message corresponding to the data response method. In this case, for example, if the data request method or the data response method is called, a return value is returned and the return value can be transmitted in a manner of being included in the data request message or the data response message.

In this case, the return value corresponds to information on Table 5 and service protocol type information and port number information can be included in the information. As mentioned in the foregoing description, the service protocol type information and the port number information may not be exchanged in a procedure of performing discovery on a service. In order to exchange data for a specific service, it is necessary to additionally have information on a service protocol type and information on a port number. In this case, the abovementioned information is returned as a return value of the data request method or the data response method and the information can be transmitted in a manner of being included in a message corresponding to each of the data request method and the data response method, by which the present invention may be non-limited.

The service protocol type information and the port number information, which are returned as a return value based on the data request method, can be transmitted in a manner of being included in the data request message. A first NAN terminal performs data exchange. The embodiments of the present invention can be implemented via various means. For example, the embodiments of the present invention can be implemented by hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary.

INDUSTRIAL APPLICABILITY

The present invention has been explained under the assumption that the present invention is applied to a NAN wireless communication system, by which the present invention may be non-limited. The present invention can be applied to various wireless communication systems using the same scheme.

What is claimed is:

1. A method of performing data exchange, which is performed by a first NAN (Neighbor Awareness Networking) UE (user equipment) in a wireless communication system, the method comprising:
    performing discovery on a first service using a publish message;
    transmitting a data request message for forming a NAN data path to a second NAN UE discovered for the first service;
    receiving a data response message from the second NAN UE,
    wherein the data response message includes an Internet Protocol (IP) address and port information; and
    performing a connection for data exchange for the first service with the second NAN UE based on the IP address and the port information,
    wherein the data request message includes ID (identification) information assigned to identify the NAN data path.

2. The method of claim 1, wherein the port information includes information on a port number of a TCP (Transmission Control Protocol) or a port number of a UDP (User Datagram Protocol).

3. The method of claim 1, wherein the data response message further includes a service protocol type information, and
    wherein the service protocol type information is information about a TCP (Transmission Control Protocol) or a UDP (User Datagram Protocol).

4. The method of claim 1, wherein the connection is a TCP (Transmission Control Protocol)/IP connection.

5. The method of claim 1, wherein the data request message includes an IP address for the first NAN UE.

6. The method of claim 1, wherein the data response message corresponds to a message transmitted based on a data response method called by the second NAN UE, and
    wherein the data response message includes port information and the IP address returned as a return value based on the data response method.

7. The method of claim 6, wherein the return value, which is returned based on the data response method, further comprises information on a second service type.

8. The method of claim 7, wherein the information on the second service type corresponds to information indicating a service providing type for the first service selected from among one-to-one type, one-to-many type, and many-to-many type.

9. The method of claim 8, wherein if the information on the second service type indicates the one-to-one type, unicast address information is contained in the data response message.

10. The method of claim 8, wherein if the information on the second service type indicates the one-to-many type or the many-to-many type, multicast address information is contained in the data response message.

11. A first NAN UE (user equipment) performing data exchange in a wireless communication system, comprising:
    a reception module configured to receive information from an external device;
    a transmission module configured to transmit information to an external device; and
    a processor configured to control the reception module and the transmission module,
    wherein the processor is configured to:
    perform discovery on a first service using a publish message,
    control the transmission module to transmit a data request message for forming a NAN data path to a second NAN UE discovered for the first service,
    control the reception module to receive a data response message from the second NAN UE, wherein the data response message includes an Internet Protocol (IP) address and port information, and
    perform a connection for data exchange for the first service with the second NAN UE based on the IP address and the port information,
    wherein the data request message includes ID (identification) information assigned to identify the NAN data path.

12. The first NAN UE of claim 11, wherein the port information includes information on a port number of a TCP (Transmission Control Protocol) or a port number of a UDP (User Datagram Protocol).

13. The first NAN UE of claim 11, wherein the data response message further includes a service protocol type information, and
    wherein the service protocol type information is information about a TCP (Transmission Control Protocol) or a UDP (User Datagram Protocol).

14. The first NAN UE of claim 11, wherein the connection is a TCP (Transmission Control Protocol)/IP connection.

15. The first NAN UE of claim 11, wherein the data request message includes an IP address for the first NAN UE.

* * * * *